United States Patent [19]
Beuk

[11] Patent Number: 5,910,797
[45] Date of Patent: *Jun. 8, 1999

[54] PORTABLE DATA PROCESSING APPARATUS PROVIDED WITH A SCREEN AND A GRAVITATION-CONTROLLED SENSOR FOR SCREEN ORIENTATION

[75] Inventor: Leonardus G. M. Beuk, Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/601,140
[22] Filed: Feb. 13, 1996
[30] Foreign Application Priority Data

Feb. 13, 1995 [EP] European Pat. Off. .............. 95200338

[51] Int. Cl.[6] ...................................................... G09G 5/08
[52] U.S. Cl. ................................ 345/157; 345/156; 463/7
[58] Field of Search .................................. 345/7, 112, 8, 345/145, 156, 157, 161, 163; 463/3, 7, 38; 364/708.1

[56] References Cited

U.S. PATENT DOCUMENTS

| | | | |
|---|---|---|---|
| 4,503,299 | 3/1985 | Henrard et al. | 345/156 |
| 5,181,181 | 1/1993 | Glynn | 345/163 |
| 5,440,326 | 8/1995 | Quinn | 345/156 |
| 5,526,022 | 6/1996 | Donahue et al. | 345/156 |
| 5,602,569 | 2/1997 | Kato | 345/156 |

*Primary Examiner*—Richard A. Hjerpe
*Assistant Examiner*—Kent Chang
*Attorney, Agent, or Firm*—Brian J. Wieghaus

[57] ABSTRACT

A portable data processing apparatus has an integrated screen that displays one or more graphical or other objects presented thereto. The screen has a gravitation-controlled sensor for measuring a spatial orientation thereof. The apparatus has a programmed data processor for under control of a predetermined range of spatial orientations imparting a non-stationary motion pattern to a predetermined selection among the objects. The motion can be used in the way of a joystick. Eventually it may result in off-screen dumping, loading, or transfer of an associated object.

11 Claims, 2 Drawing Sheets

PORTABLE DATA PROCESSING APPARATUS PROVIDED WITH A SCREEN AND A GRAVITATION-CONTROLLED SENSOR FOR SCREEN ORIENTATION

BACKGROUND OF THE INVENTION

The invention relates to a portable apparatus having data processing means and integrated screen means for displaying one or more graphical or other objects presented by said data processing means, said screen means having gravitation-controlled sensor means feeding said data processing means for measuring a spatial orientation of said screen means. It has been known to sense the spatial orientation of a display apparatus, for example a television monitor, and control the orientation of the image in such a way that the image is always oriented vertically and with the right side up. The inventor has found that various spatial orientations of an apparatus according to the preamble may control associated object motions on the screen, and has envisaged various useful applications of a device that is enhanced in such manner.

SUMMARY OF THE INVENTION

Accordingly, amongst other things, it is an object of the present invention to provide an apparatus according to the preamble wherein the orientation of the screen can be used to control various different types of motion depending on the actual spatial orientation. Now, according to one of its aspects, the invention provides such apparatus, wherein said data processing means have programmed calculating means for under control of a predetermined range of spatial orientations imparting an acceleration based motion pattern to a predetermined selection among said objects. Due to the fact that the motion is acceleration based, the latter can be used to implement various types of game and to exercise handling skills; in various embodiments, the sensor means operate in the manner of a joystick. By itself, joysticks and similar devices are in wide use. The effect of a joystick may be a bidirectional switch in two mutually perpendicular directions. Independent operation thereof selects four directions. Combined operation selects eight directions. The effect may also be an analog control quantity in two mutually perpendicular directions. Combined operation may then select any direction in an XY coordinate system on the screen. This joystick function is in particular effected by the orientation of the screen influencing the motion pattern of the displayed objects. In contradistinction, with respect to the television apparatus, supra, only the stationary orientation of the image, but no motion thereof may vary with the orientation of the apparatus. The invention does not relate to sensing the orientation of the screen by a device that operates the way of a compass in that it would be based on gyroscopic or magnetic principles. The selection of the moving objects may encompass a single one or more displayed objects, or rather all of them.

Advantageously, the motion is linewise and parallel to an inclination vector of said screen means with respect to a vertical direction. The inclination vector is defined as the difference between the vertical direction in the world coordinate system, and the vertical direction with respect to the orientation of the apparatus. In this way, the inclination can emulate some type of artificial gravity that may induce "pseudo falling" of displayed objects. The acceleration based motion can be subject to steady acceleration or other types of behaviour. Often, changing the screen orientation whilst the gravitation vector remains parallel or nearly parallel to the plane of the screen need have no motion controlling effect.

Advantageously, the motion pattern is restrained by one or more further on-screen objects. Such objects, in the form of gates, channels and the like, can then implement a game based on moving an object through a maze, positioning a ball in a shallow potential dip, and many others that require manipulatory skills from a user person.

Advantageously, a predetermined amount represents a transfer of an associated predetermined object between said screen means and a predetermined off-screen device. In this way, inclination of the apparatus may effect data processing effects per se, even apart from the moving around of the object. Storage, printing, reading from a memory chip card, deleting of text, and transmission to a remote data processing device are realizations of this kind of feature. In case of text, vertical motion thereof may be organized to represent scrolling. In the latter case even an ongoing dialog between two apparatuses of the kind described can be maintained.

Further advantageous aspects of the invention are recited in dependent claims.

BRIEF DESCRIPTION OF THE DRAWINGS

These and other aspects and advantages of the invention will be discussed more in detail with reference to preferred embodiments disclosed hereinafter, and more in particular with reference to appended Figures that show.

DETAILED DESCRIPTION OF PREFERRED EMBODIMENTS

Figure 1:
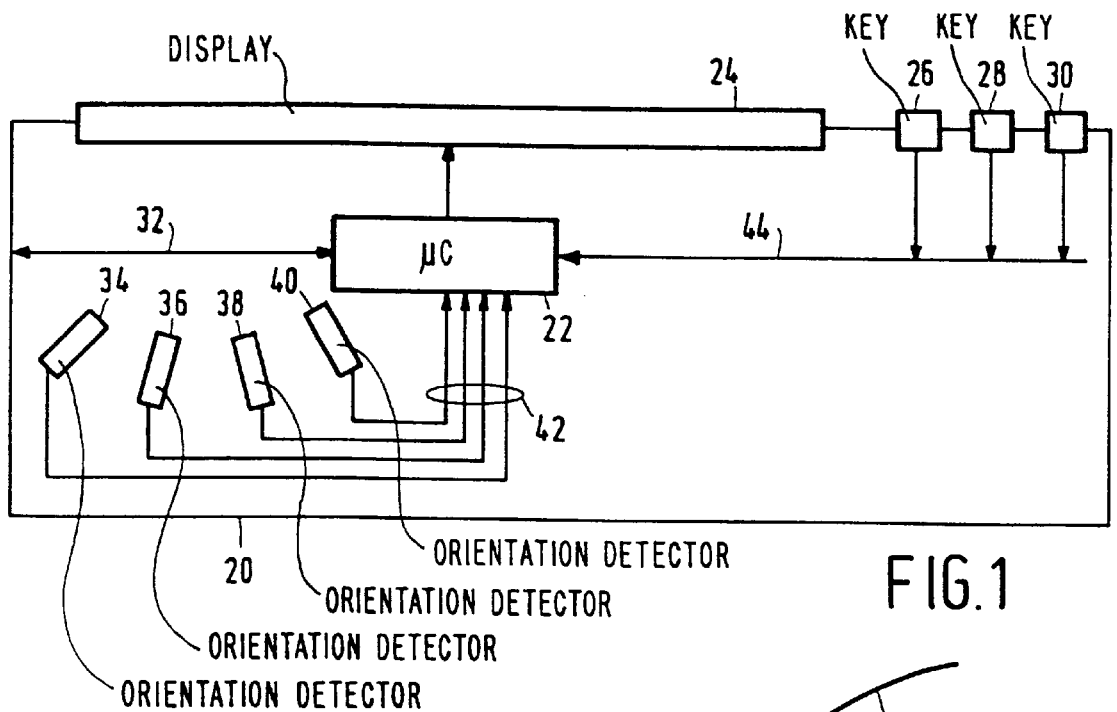
FIG. 1 shows an apparatus diagram according to the invention.

FIG. 1 shows an apparatus diagram according to the invention. The apparatus comprises a housing 20, data microprocessor 22, display screen 24, keys 26, 28, 30 that upon actuation provide key data on key bus 44 and output line 32 for connection to an external peripheral device such as printer or an antenna for broadcast output, or an insert for positioning a memory chip card or similar storage-oriented device. Addition of various other peripherals that are common in the art of hand-held games is feasible. The above configuration can operate in a way that has been widely practised for handheld calculators, handheld game-oriented devices, or so-called Personal Digital Assistants. The display may be 5×5 cms, or any other reasonable dimension, and may also be circular or otherwise non-square. It may be based on standard LCD technology. In addition to the above, the apparatus has gravitation-controlled detectors 34, 36, 38, 40 that singly or collectively measure a spatial orientation around an axis that is perpendicular to the plane of the Figure. A similar arrangement may be provided for measuring the spatial orientation around an axis that is horizontal in the plane of the Figure. The technology of the determination may be based on the weight of an element internal to the detector, such as a drop of mercury that does or does not wet a particular electrical contact. Another solution is that the differential weight of another element of the apparatus in various orientations is determined, such as the weight of the display element itself. For example, a first sensor measures gravitation force in a direction perpendicular to the display surface, such as being based on piezoelectricity or strain gauges. Two other such sensors each measure the gravitation force in one of two mutually perpendicular directions within the plane of the display. These three measured quantities together yield the overall spatial orientation of the apparatus with respect to the direction of gravity. In the latter case, facility could as well be provided for measuring dynamical changes of the spatial orientation, such as by acceleration of the screen. This feature can have an on-off character or an analog representation.

Figure 2:
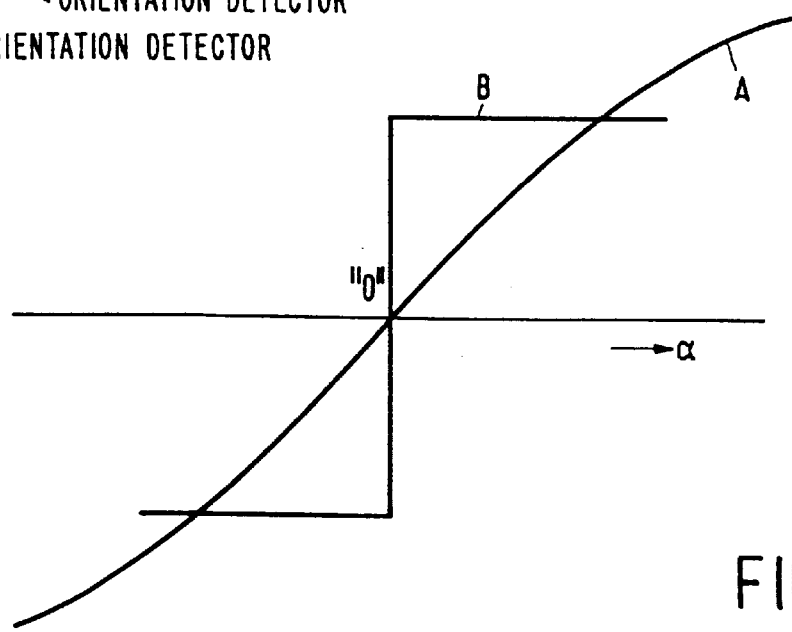
FIG. 2 shows various sensor characteristics for the invention.

FIG. 2 shows various sensor characteristics for use with the invention. Generally, there are two distinct classes of response as a function of the inclination angle α. Curve A gives an analog or gradual response: for α equal to zero, a standard value is produced, such as "zero". In first approximation, the change of the signal is proportional to the inclination angle. For greater inclination a saturation effect, such as according to a sine curve may occur. Curve B gives a step response: depending on whether the inclination is positive or negative, the signal may have a first or rather a second value. These two values may lie symmetrically with respect to zero. Combining two or more sensors with different orientations may produce orientation values in a wider range of orientations around a single axis, such as by the four sensors in FIG. 1. Likewise, combination of various sensors may yield orientation in three-dimensional space, again through A/D conversion and trigonometric calculations. Alternatively, the sensor signal may be used directly to control the motion of on screen objects. In the latter case, A/D conversion alone were enough.

Figure 3:
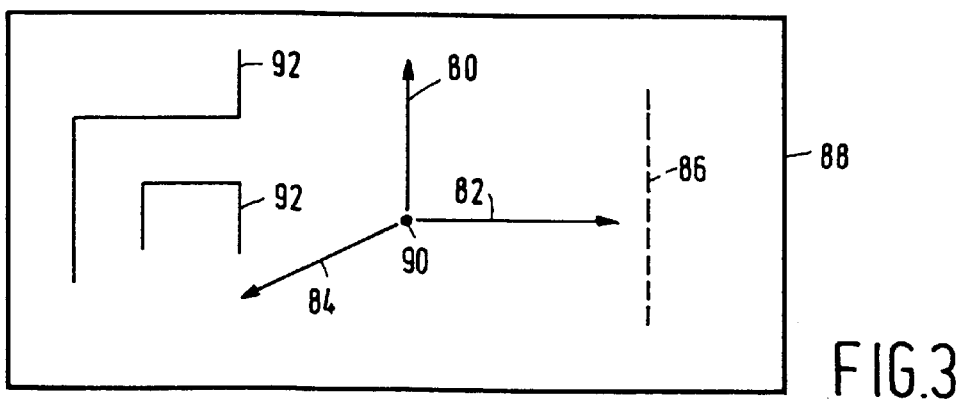
FIG. 3 shows various motion pattern shapes with the invention.

FIG. 3 shows various motion pattern shapes realizable with the invention. The display area 88 is rectangular at a size of 8×12 centimetres. The original position of the object is at indication 90. The object may be a dot as shown, but may have the representation of an fixed-shape icon, or may even be an animated figure of variable shape. It may be a more or less continuous object, such as representing a piece of fluid tar that slowly moves about the screen, while also changing its shape. If non-graphical, it may be a block of text of finite size. The motion may, as shown by arrows 80, 82, be restricted to the coordinate directions, or may go in any orientation, as shown by arrow 84. The motion may be constrained by artificial boundaries such as 86, or by a part of a maze 92. If the motion causes touching of the constraint, this may lead to an error signalization, such as in the case of a manipulation game, such as for moving a ball through a maze. The touching then may terminate the game, increase an error score, or cause any well known procedure in this type of games. On the other hand, the touching of the constraint may trigger a distinct operation, such as an output operation on the text block. The outputting of such text block may depend on the direction of motion. For example, if horizontal, the outputting may be effected as a one-shot operation, whereas if vertical, the outputting is by linewise scrolling. If the constraint is nonoperative, the motion may continue to the edge of the screen or even further. The object during motion may rotate and be displayed in the form of a wheel or the like. The motion may be controlled along non-straight trajectories, such as parabolas, or may comprise oscillating or rotary motion or motion components. The motion may be constrained by soft boundaries, such as gravitational potential wells. In all cases, the motion is accelaration based, such as with respect to altering the motion vector of the object with respect to speed or direction; because altering of spatial orientation of the screen effects a dynamical change of the motion pattern.

Figure 4:
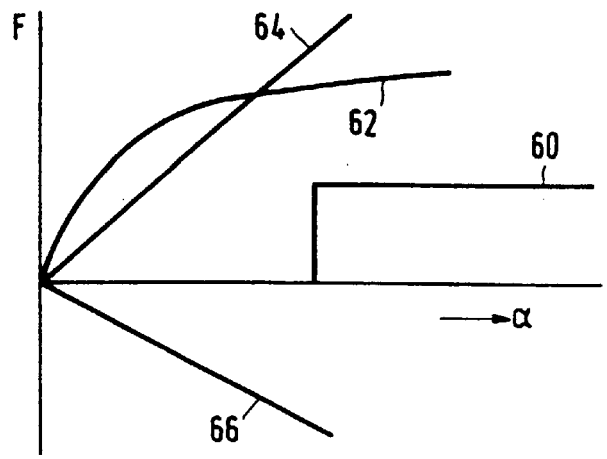
FIG. 4 shows various motion characteristics with the invention.

FIG. 4 shows various motion characteristics realizable with the invention. The horizontal axis gives the inclination angle α as in FIG. 2. The vertical axis gives a pseudo force exerted on the object. Such a force if steady, in combination with a pseudo mass of the object, would result in a uniform acceleration. Curve 64 gives such a constant force, that would make the object 'fall' under constant acceleration. Curve 66 is directed in the other direction, and would make the object to 'fly like a balloon'. Other characteristics are given by curves 60, that has a threshold angle, and curve 62, where the force attains an asymptote. Other characteristics, as well as combinations of the above are feasible. In all cases, the vertical quantity may be the actual velocity attained instead of the force.

Figure 5:
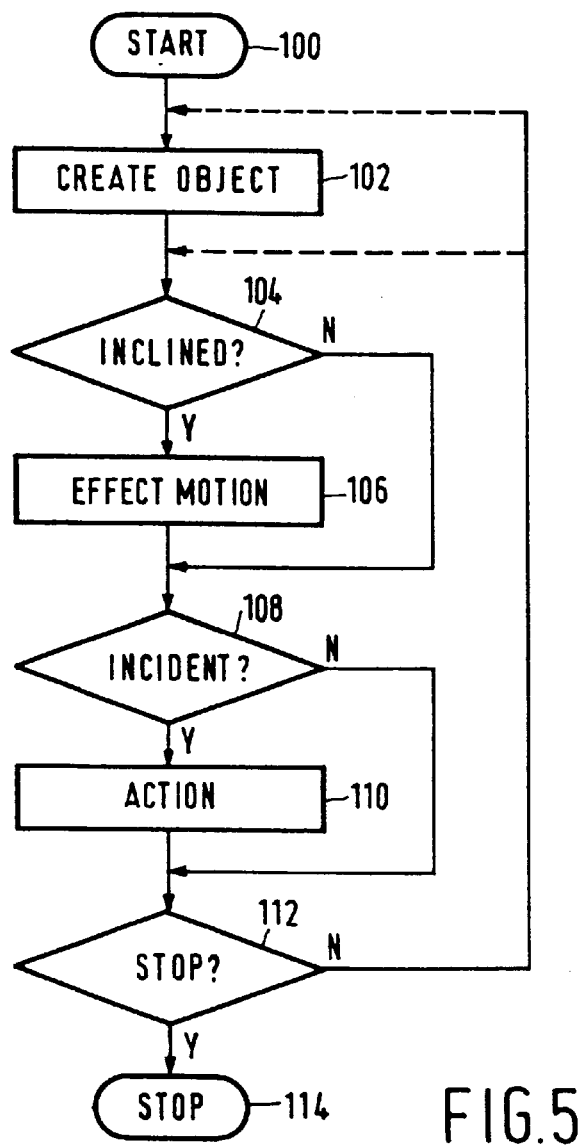
FIG. 5 shows a flow chart for use with the invention.

FIG. 5 is a flow chart for use with the invention, such as in a manipulatory game. Block 100 represents the start of the game, initializing the score, defining the maze, the level of user person skill, and other game elements as applicable. In block 102, the object to be moved is created. There may be more than one moving object around that is influenced by the pseudo gravitation, possibly in different ways. In block 104, the existence of non-zero inclination is sensed, or rather a non-zero change of inclination. If yes, in block 104 the motion is amended; in this example, the motion only depends on actual inclination. If the inclination is steady, the motion remains uniform. In block 108, occurrence of an incident is detected, such as collision with a constraint. If yes, in block 110 appropriate action is taken, such as bouncing back, increase of error score, termination of the object or of the total game, and the like. Absent the incident, the process goes to block 112. Here detection of a termination situation is detected. This may relate to power off, to attainment of a limit score for the errors, to attainment of the goal of the game, and so on. If yes, in block 114 the game is terminated. If no in block 112, the system may revert to block 104 and proceed with the moving object, or rather to block 102, where a new object is created, and a new round commenced. The game can be extended in many different ways without deviating from the present inventive thought.

What is claimed is:

1. A manipulatable apparatus having data processing means and screen means for displaying one or more graphical or other objects presented by said data processing means, a gravitation-controlled sensor integrated with said screen means and feeding said data processing means for measuring an acceleration of said screen means induced by user manipulation of the screen means, wherein said data processing means have programmed calculating means for under control of a screen motion sensed by said sensing means imparting an acceleration based motion pattern to a predetermined selection among said objects.

2. An apparatus as claimed in claim 1, wherein said predetermined range of spatial orientations is limited to having a gravitation vector component perpendicular to said screen means.

3. An apparatus as claimed in claims 1, wherein said gravitation-controlled sensor means control said motion in the manner of a joystick.

4. An apparatus as claimed in claim 1, wherein said motion is linewise and parallel to an inclination vector of said screen means with respect to a vertical direction.

5. An apparatus as claimed in claim 1, wherein said motion pattern is different among at least two simultaneous selections among said objects.

6. An apparatus as claimed in claim 1, wherein said motion is nonuniform in time under control of a static said orientation of the screen means.

7. An apparatus as claimed in claim 1, wherein said motion pattern is constrained by one or more further on-screen objects.

8. An apparatus as claim 1, wherein said motion represents a a motion of the object as if the force applied to the screen were applied to the object.

9. An apparatus as claimed in claim 1, wherein said motion represents a scrolling effect on an associated text object.

10. An apparatus as claimed in claim 1, wherein a predetermined amount of said motion effects a removal of an associated predetermined object from said screen means and transmission to a remote data processing device.

11. A manipulatable apparatus having data processing means and a display screen for displaying one or more graphical or other objects presented by said data processing means, a gravitation-controlled sensor integrated with said display screen and feeding said data processing means for measuring dynamical changes of the spatial orientation of said display screen induced by user manipulation of the display screen, wherein said data processing means have programmed calculating means for under control of a screen motion sensed by said sensor, due to dynamical changes of the spatial orientation of the screen, imparting an acceleration based motion pattern to a predetermined selection among said objects which motion corresponds to the dynamical change of the spatial orientation of the screen.

* * * * *